(12) United States Patent
Lütke et al.

(10) Patent No.: US 6,229,476 B1
(45) Date of Patent: May 8, 2001

(54) LIQUID LEVEL METER

(75) Inventors: Wolfram Lütke, Inzlingen; Joachim Neuhaus, Steinen; Ralf Reimelt, Freiburg; Werner Thoren, Steinen, all of (DE)

(73) Assignee: Endress+ Hauser GmbH+ Co., Maulburg (DE)

( * ) Notice: Subject to any disclaimer, the term of this patent is extended or adjusted under 35 U.S.C. 154(b) by 0 days.

(21) Appl. No.: 09/447,189

(22) Filed: Nov. 22, 1999

Related U.S. Application Data
(60) Provisional application No. 60/127,377, filed on Apr. 1, 1999.

(30) Foreign Application Priority Data

Nov. 27, 1998 (EP) .................................................. 98122614

(51) Int. Cl.⁷ .................................................. G01F 23/284
(52) U.S. Cl. ............................... 342/124; 342/5; 342/118; 324/332; 73/290 R; 73/304 R; 73/305; 73/322.5
(58) Field of Search .................................. 342/124, 5, 6, 342/7, 8, 9, 10, 11, 118; 73/290 R, 291, 304 R, 304 C, 305, 311, 322.5, 319; 324/332, 333

(56) References Cited

U.S. PATENT DOCUMENTS 5,054,319 * 10/1991 Fling ....................................... 73/319

FOREIGN PATENT DOCUMENTS 58-198726 * 11/1983 (JP) ....................................... 342/124
4-213025 * 8/1992 (JP) ....................................... 342/124

* cited by examiner

*Primary Examiner*—Bernarr E. Gregory
(74) *Attorney, Agent, or Firm*—Bose McKinney & Evans LLP

(57) ABSTRACT

A liquid level meter is provided for measuring a level of a liquid (1) in a container (3), which meter measures acceptably in the case of liquids with low dielectric constants, and the installation and maintenance of which are simple and cost effective. This meter comprises an electronic circuit (13), which generates electromagnetic signals in operation, a conductor (7), which projects into the container (3), along which a float (11, 11a, 11b, 11c, 11d, 11e) moves along with the level, which has at least one segment reflecting electromagnetic signals, an injector (9), which transmits the signals from the circuit (13) to the conductor (7), which conductor (7) leads the signals into the container (3) and leads out a signal reflected at the float (11) and a receiving and evaluating circuit (15), which receives the reflected signals, which determines a travel time of the signals and which ascertains the level from the travel time.

8 Claims, 6 Drawing Sheets

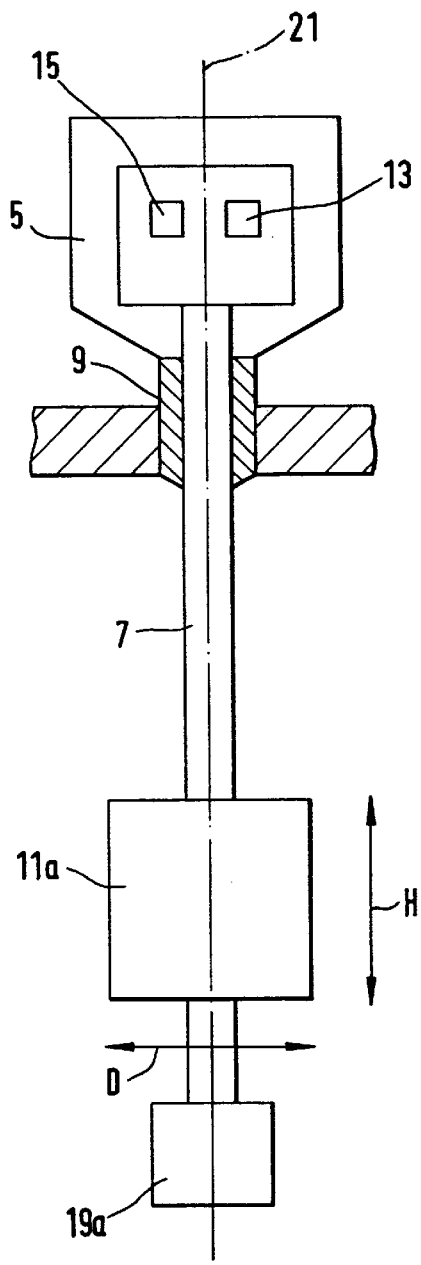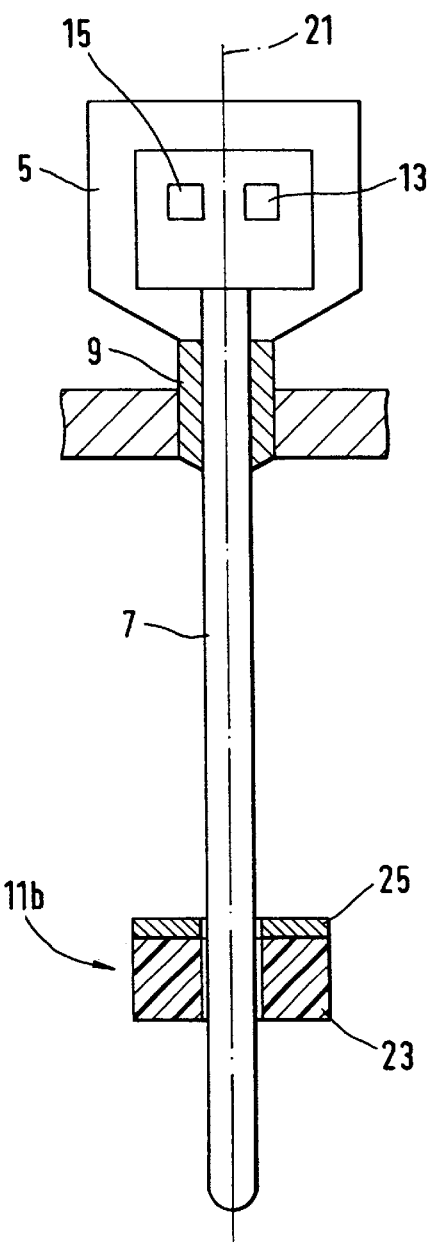

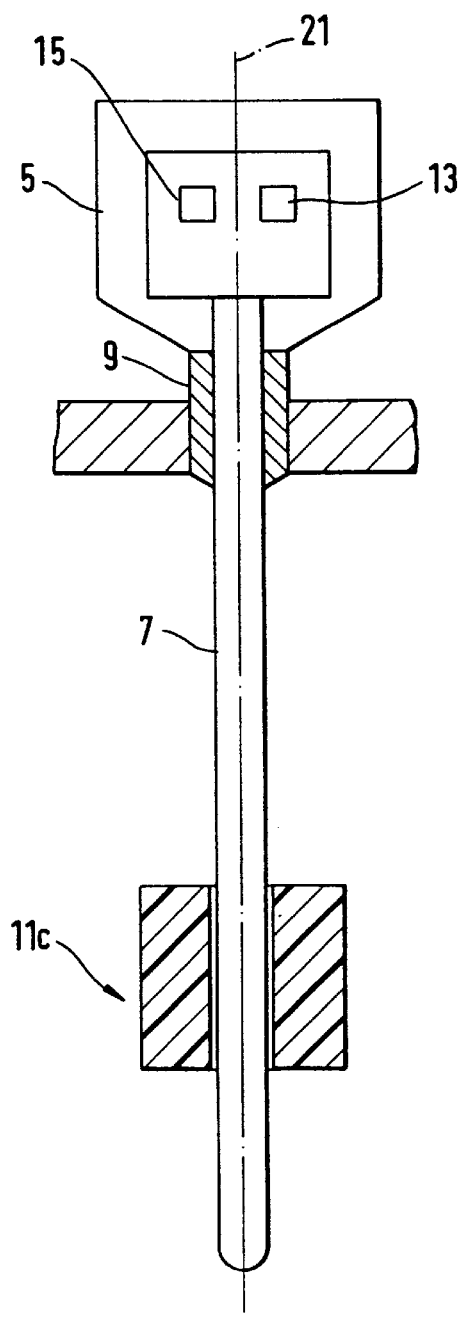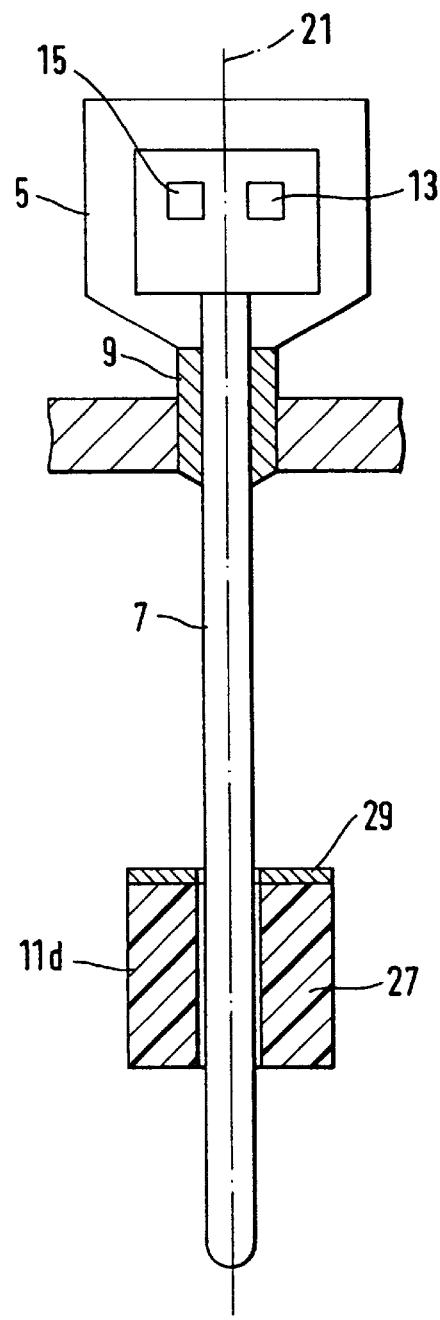

LIQUID LEVEL METER

This application claims benefit to provisional application No. 60/127,377 filed Apr. 1, 1999.

BACKGROUND OF THE INVENTION

The invention relates to a liquid level meter for measuring a level of a liquid in a container, in which electromagnetic signals are transmitted in the direction of the surface of the filled material, and their echo is received. A time of flight required by a signal for the path to the surface of the filled material and back is ascertained, and the level is determined therefrom.

Liquid level meters operating with electromagnetic signals can be used in a multiplicity of applications, both in storage and in the processing industry, for example in chemistry, in the food industry and in the oil industry.

Liquid level meters operating with microwaves, inter alia, are commercially available. Said meters are divided into two classes: a first class, in which the microwaves are transmitted by means of an antenna in the direction of the filled material, are reflected at the surface of the filled material and, after a time of flight which is a function of distance, are subsequently received again; and a second class, in which the microwaves are guided along a waveguide in the direction of the filled material and are reflected at the surface of the filled material because of the jump in impedance there, and the reflected waves are guided out of the container again along the waveguide.

In this case, the waveguide can be provided both by a single conductor and by two or more conductors which are arranged parallel to one another and extend downwards into the container from a point above the highest level to be measured.

DE-U 94 21 870 specifies a liquid level meter for measuring a level of a liquid in a container, which comprises an electronic circuit which generates electromagnetic signals in operation, a conductor which projects into the container, an injector which transmits the signals from the circuit to the conductor, which conductor leads the signals into the container and leads out signals reflected at a surface of the filled material, and a receiving and evaluating circuit which receives reflected signals, which determines a time of flight of the electromagnetic signals and which ascertains the level from the time of flight.

An electronic circuit for generating the electromagnetic signals, and a receiving and evaluating circuit, are described, for example, in U.S. Pat. No. 5,841,666.

In the case of the liquid level meter in accordance with DE-U 94 21 870, the signals are short electromagnetic pulses which are reflected at the surface of the filled material. The proportion of the signals which is reflected depends in this case on the difference between the dielectric constants of the filled material and the medium located above the filled material.

If the difference is large, the measurement effect is also marked, and the time of flight can be determined acceptably. However, if the difference is slight, the reflection originating at the surface of the filled material can no longer be readily ascertained. In such applications, the described liquid level meter is not functional. An example for such a problematic application is the measurement of a level in an oil-filled container. Oil has a dielectric constant of approximately 2, while the air typically located above the oil has a dielectric constant of 1.

This effect also occurs in liquid level measurement by means of free microwaves which are transmitted in the direction of the surface of the filled material and are reflected at the surface, their echo signal being evaluated in order to determine the level.

A description is given in DE-A 44 19 462 of a liquid level meter which operates with microwaves and in the case of which microwaves are transmitted into a stilling well projecting into a container. In this case, the stilling well serves as a waveguide for the microwaves. It is specified for applications in which the filled material has a low dielectric constant in order to provide a float with a strongly reflecting surface in the stilling well.

A stilling well is a large bulky and therefore cumbersome component, and therefore cannot be used when only a little space is available and/or an opening provided for a liquid level meter has too small a diameter. The installation of a stilling well is complicated and expensive. Moreover, in the case, for example, of applications for which the stilling well comes into contact with viscous and/or sticky media, regular cleaning may be required for the float to remain freely movable.

BRIEF DESCRIPTION OF THE INVENTION

It is an object of the invention to specify a liquid level meter for measuring a level of a liquid in a container, in which electromagnetic signals are transmitted in the direction of the surface of the filled material, and their echo is received, which meter measures acceptably in the case of liquids with low dielectric constants, and the installation and maintenance of which are simple and cost effective.

For this purpose, the invention comprises a liquid level meter for measuring a level of a liquid in a container, which comprises an electronic circuit which generates electromagnetic signals in operation, a conductor which projects into the container, along which a float moves along with the level, which has at least one segment reflecting electromagnetic signals, an injector which transmits the signals from the circuit to the conductor, which conductor leads the signals into the container and leads out a signal reflected at the float, and a receiving and evaluating circuit which receives the reflected signal, which determines a time of flight of the electromagnetic signals and which ascertains the level from the time of flight.

In accordance with one preferred embodiment, the float is a hollow body and the segment reflecting electromagnetic waves is a metal or metal-coated lateral surface of the hollow body.

In accordance with one another preferred embodiment, the segment is a surface which is arranged in the interior of the float and reflects electromagnetic signals.

In accordance with still another preferred embodiment, the segment is a surface which runs perpendicular to an axis of the conductor and reflects electromagnetic signals.

In accordance with still another preferred embodiment, the float consists of a material with a high dielectric constant which reflects electromagnetic waves.

In accordance with still another preferred embodiment, there is provided at an end of the conductor averted from the injector a holder on which the float rests when the liquid surface is located below the holder.

In accordance with still another preferred embodiment, the float surrounds a cylindrical section of the conductor on all sides.

In accordance with still another preferred embodiment, the reflecting segment has a reflecting surface which lies in a plane with the surface of the filled material.

Such a liquid level meter offers the advantage that reliable measurements are possible even in the case of liquids with low dielectric constants.

BRIEF DESCRIPTION OF THE DRAWINGS

The invention and further advantages will now be explained in more detail with the aid of the figures of the drawing, in which six exemplary embodiments are represented; identical elements are provided in the figures with the same reference symbols. In the drawing:

FIG. 2 shows a second exemplary embodiment of a liquid level meter;

FIG. 3 shows a third exemplary embodiment of a liquid level meter;

FIG. 4 shows a fourth exemplary embodiment of a liquid level meter;

FIG. 5 shows a fifth exemplary embodiment of a liquid level meter; and

DETAILED DESCRIPTION OF THE INVENTION

Figure 1:
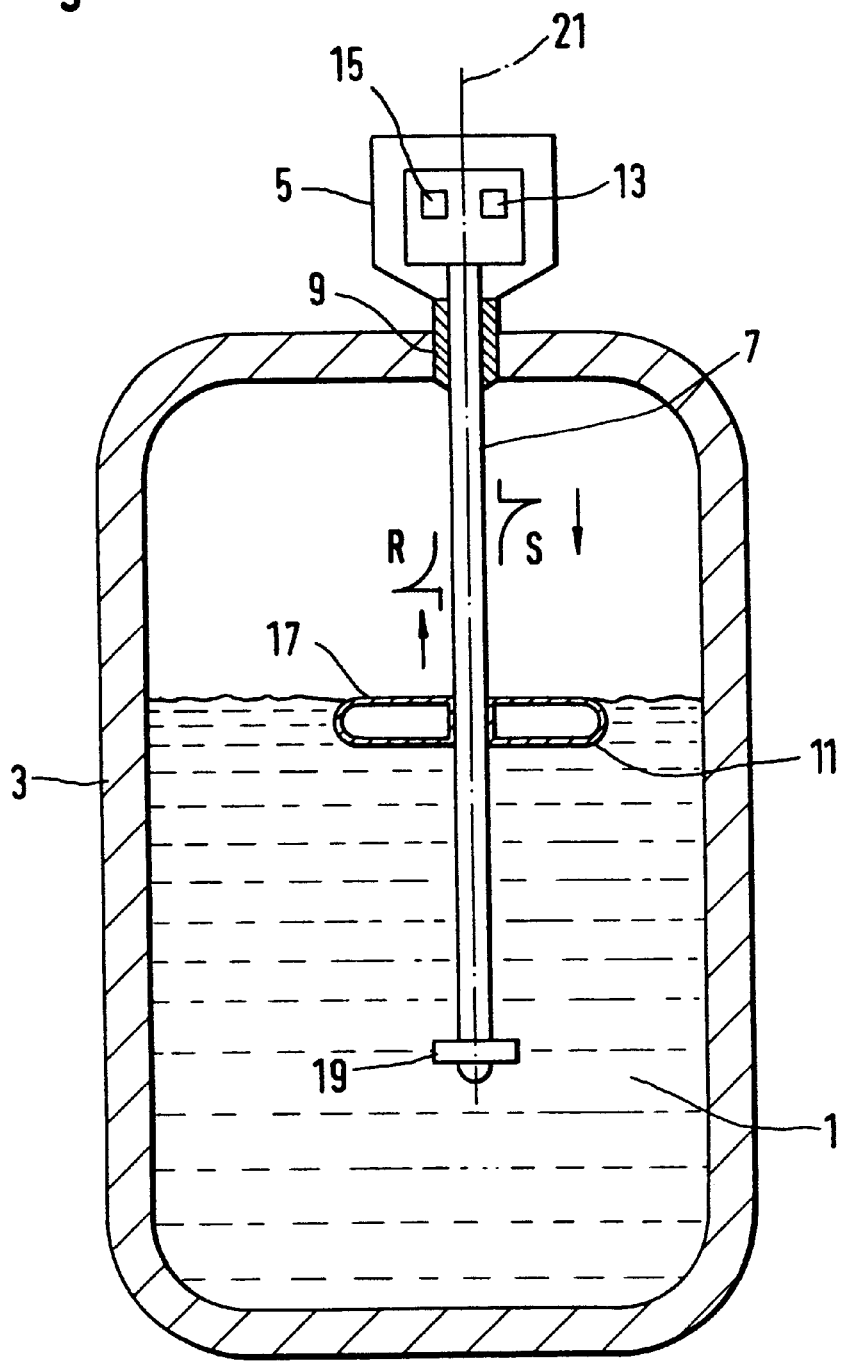
FIG. 1 shows a diagrammatic representation of a first exemplary embodiment of a liquid level meter according to the invention, in a container.

A first exemplary embodiment of a liquid level meter according to the invention is represented in FIG. 1. It serves to measure a level of a liquid 1 in a container 3.

The liquid level meter comprises a housing 5 which is arranged outside the container 3 and to which there is connected a conductor 7 which projects into the container 3. An injector 9 is provided which is connected to the housing 5 and, as represented merely diagrammatically in FIG. 1, is mounted in an opening in the container 3. The injector 9 can have, for example, an external thread by means of which it can be screwed into an internal thread arranged in the opening, or it can have a flange which can be fastened on a mating flange surrounding the opening. Other types of fastening known to the person skilled in the art are likewise conceivable.

The conductor 7 is guided in the interior of the injector 9 from the housing 5 into the container 3. The conductor 7 is, for example, a mechanically rigid rod or a mechanically rigid wire. However, it is equally possible to use a tensioned cable, of which one end is fastened on the housing 5 or the injector 9 and the other end is fastened on a bottom of the container. Instead of fastening the other end on the container bottom, it is also possible to fasten on the other end a weight by means of which the cable is tensioned.

Provided on the conductor 7 is a float 11 which floats on the liquid and thereby moves along with the level in the container 3. The level is represented in FIG. 1 diagrammatically by means of wavy lines.

Provision is made of an electronic circuit 13 which generates electromagnetic signals S in operation. Said signals S are transmitted via the injector 9 from the circuit 13 to the conductor 7 and led along the conductor 7 into the container 3.

The float 11 has at least one segment which reflects electromagnetic signals and at which a proportion of the signal S is reflected. A signal R reflected at the float 11 is led out of the container 3 via the conductor 7.

The reflected signal R is fed to a receiving and evaluating circuit 15 which receives said signal, determines a time of flight of the electromagnetic signal S from the electronic system 13 to the float 11, and of the reflected signal R from the float 11 to the receiving and evaluating circuit 15, and ascertains the level therefrom.

The propagation rate of the electromagnetic signals, and the distances between the electronic system 13 and the container bottom and between the receiving and evaluating circuit 15 and the container bottom are either known in any case, or can be obtained by simple reference measurements. Using these data, the measured time of flight yields the height of the reflecting segment of the float 11 above the container bottom, and thus the level.

In the exemplary embodiment of FIG. 1, the float 11 is a flat hollow body in the shape of an annular disk and having a central bore through which the conductor 7 is guided. The float 11 surrounds a cylindrical section of the conductor 7 on all sides. There is an annular cylindrical gap between the float 11 and the conductor 7, with the result that the float 11 can move freely along the conductor 7.

That segment of said float 11 which reflects electromagnetic waves is a metal or metal-coated lateral surface 17 of the hollow body. The lateral surface 17 faces the injector 9 and runs perpendicular to an axis 21 of the conductor 7.

Provided at an end of the conductor 7 averted from the injector 9 is a holder 19 on which the float 11 rests when the liquid surface is located below the holder 19. The holder 19 is represented merely diagrammatically and consists, for example, of a bolt which runs perpendicular to the axis 21 of the conductor 7, is screwed, for example, through the conductor 7 and has two ends which project at least so far to both sides of the conductor 7 that the float 11 is held by the holder 19 on the conductor 7.

A second, exemplary embodiment of a liquid level meter according to the invention is represented in FIG. 2. It differs from the exemplary embodiment represented in FIG. 1 only in that provision is made of a different float 11a and a different holder 19a. The float 11a is a metal or metal-coated hollow body which, just like the float 11 represented in FIG. 1, is annularly cylindrical but, by contrast with the float 11 represented in FIG. 1, is not flat but has a height H in the axial direction, this height being of the same order of magnitude as an outside diameter D of the float 11a.

The holder 19a comprises a cylindrical end piece integrally formed on the end of the conductor 7 averted from the injector.

Represented in FIGS. 3, 4, 5 and 6 are further exemplary embodiments, which differ from the two preceding ones only in the respective configuration of the float 11b, 11c, 11d and 11e. These liquid level meters can, of course, likewise be provided with holders like those represented in the case of the exemplary embodiments in FIGS. 1 and 2.

In the exemplary embodiment of FIG. 3, the float 11b has an annular cylindrical hollow body 23 made from a plastic, for example from polytetrafluoroethylene (PTFE). The subarea reflecting electromagnetic signals is a metal plate 25 which is in the shape of an annular disk and is arranged on an end face of the hollow body 23 facing the injector. Said exemplary embodiment has the advantage that a metal plate in the shape of an annular disk can rest loosely on a simple float. This is cost effective, and the mounting is simple and therefore requires only a low outlay.

In the exemplary embodiment of FIG. 4, the float 11c is a solid annular cylinder which consists of a material with a high dielectric constant which reflects electromagnetic waves. A high dielectric constant is to be understood as a dielectric constant whose value is markedly larger than the value of the dielectric constant of a medium located above the filled material. Air with a dielectric constant of 1 is typically located above the filled material. In conjunction with air, a material with a dielectric constant greater than 3 would be sufficient in order to obtain a sufficiently high reflection coefficient.

Such floats have the advantage that they are homogeneous bodies. Since no connections are required, it is very easy to produce such floats.

In the case of applications in which, for example, for reasons of mechanical and/or chemical stability the aim is to use a solid float made from a material with a relatively low dielectric constant, it is possible, as represented in FIG. 5, to provide a float 11d which has a solid basic body 27 to the end face of which, which faces the injector, there is applied a thin layer 29, for example a metal coating, a thin metal plate or a conductive plastic layer, which strongly reflects electromagnetic signals.

Figure 6:
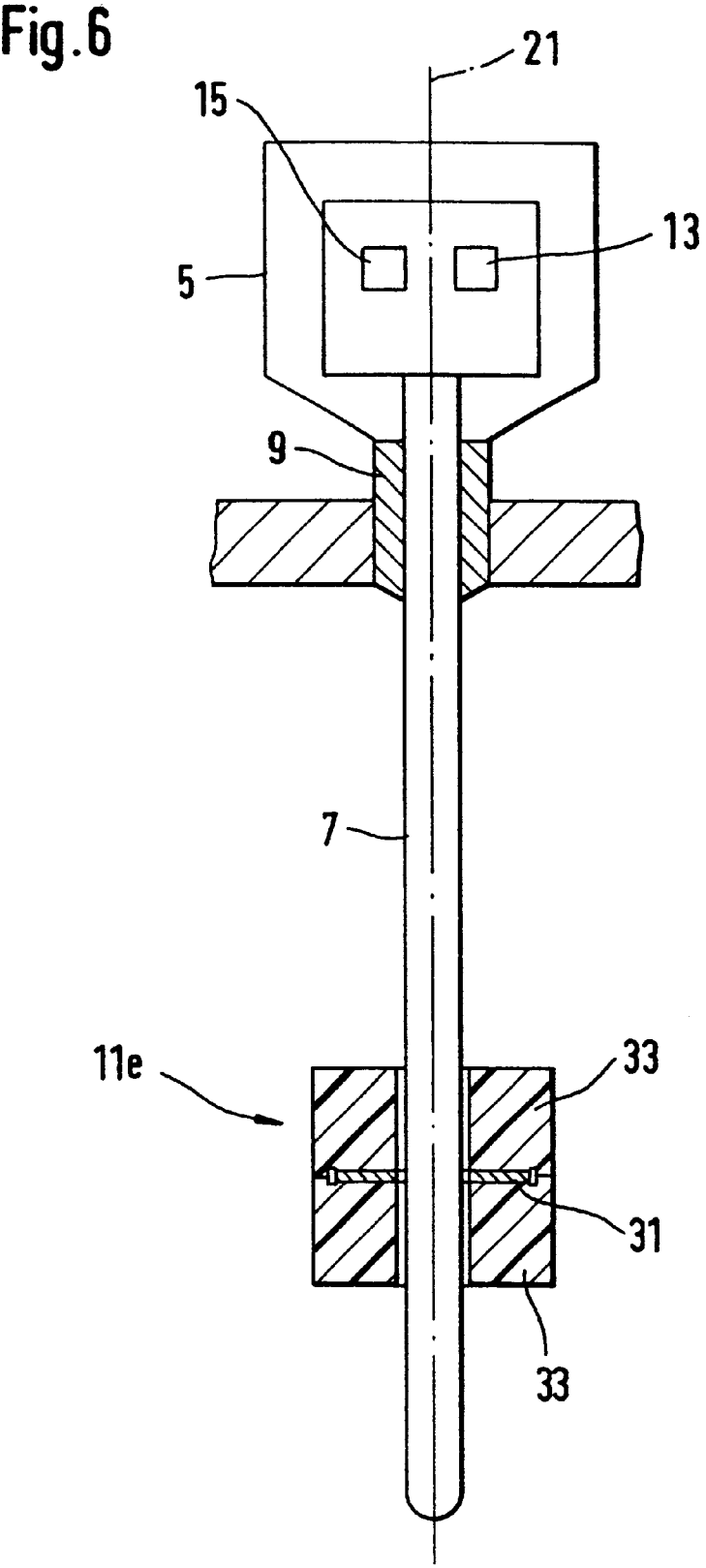
FIG. 6 shows a sixth exemplary embodiment of a liquid level meter.

FIG. 6 shows a further exemplary embodiment, having a float 11e in which a layer 31 reflecting electromagnetic signals is arranged between two component bodies 33 of the float 11e. The component bodies 33 can be both solid elements and hollow bodies. The layer 31 is, for example, a metal coating of one of the component bodies, a metal disk or a layer made from a conductive plastic. The layer 31 is preferably arranged entirely in the interior of the float 11e.

This offers the advantage that the segment reflecting electromagnetic signals, here the disk 31, does not come into contact with the filled material. There is thus virtually no risk of corrosion. The segment can therefore be produced from a simple and inexpensive material.

The materials and the dimensions of the individual components of the floats 11, 11a, 11b, 11c, 11d, 11e are preferably selected, with regard to the specific density of the filled material, such that in each case the reflecting segments have a reflecting surface which lies in a plane with the surface of the filled material and runs perpendicularly to the axis 21 of the conductor 7.

In the float 11 of FIG. 1 this reflecting surface is the lateral surface 17, in the float 11a of FIG. 2 it is an end face of the hollow body which is in the shape of an annular disk and faces the injector, in the float 11b of FIG. 3 it is the metal plate 25, in the float 11c of FIG. 4 it is an end face of the float 11c which is in the shape of an annular disk and faces the injector, in the float 11d of FIG. 5 it is the layer 29, and in the float 11e of FIG. 6 it is the reflecting layer 31.

If the reflecting segments have a reflecting surface which lies in a plane with the surface of the filled material, the result is that the time of flight measurement yields the correct level directly. Otherwise, the distance between the surface of the filled material and the reflecting plane would have to be determined and the measurement of the time of flight, or the measured level, corrected correspondingly.

Figure 7:
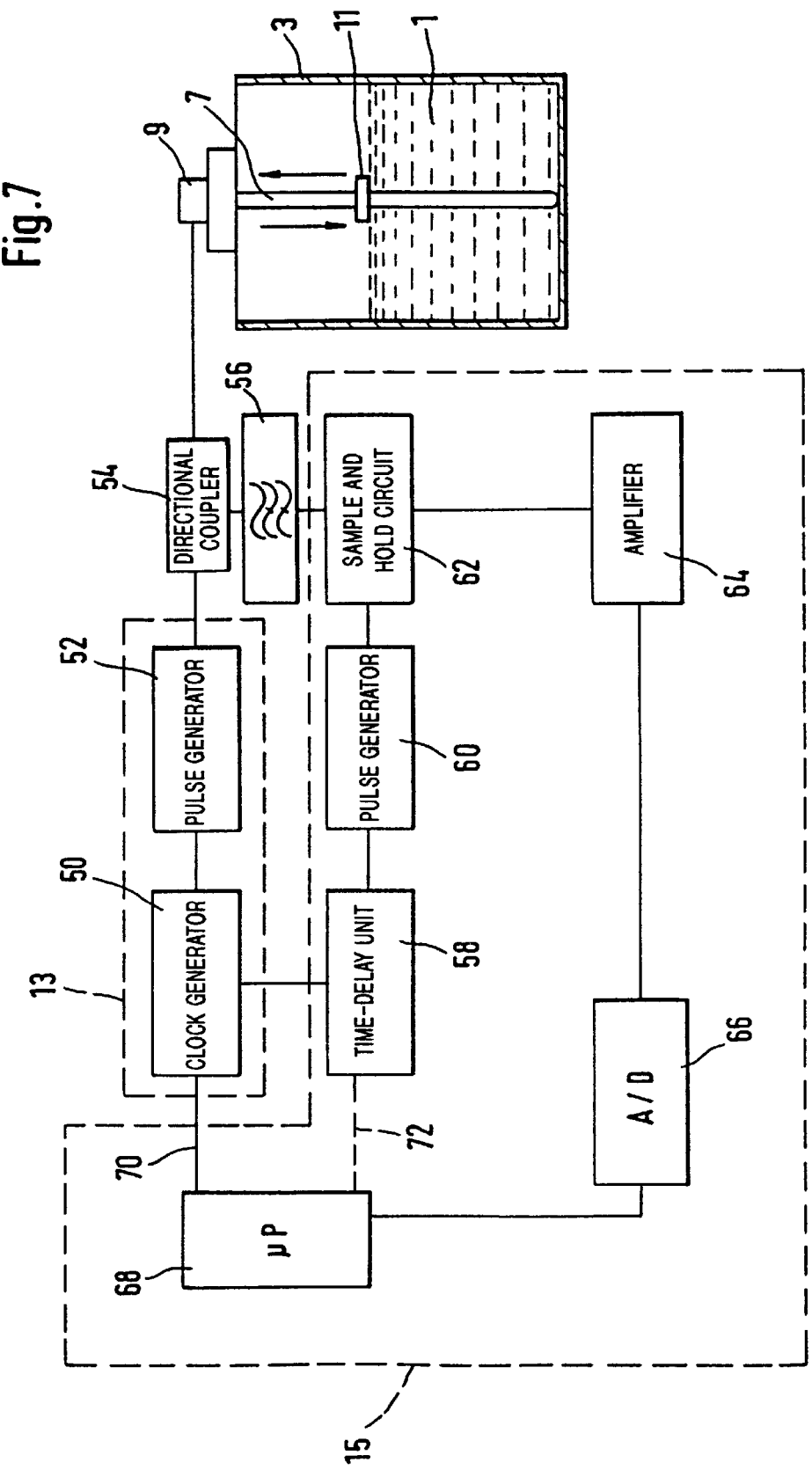
FIG. 7 shows an electronic system and a receiving and evaluating circuit of FIG. 1.

FIG. 7 shows an exemplary embodiment of a block diagram of the electronic circuit 13 and the receiving and evaluating circuit 15.

The electronic circuit 13 has a transmitting clock generator 50 and a transmitting pulse generator 52. A transmitted clock pulse of the transmitting clock generator 50 is fed to the transmitting pulse generator 52. It is preferable to use a transmitting pulse generator 52 which generates electromagnetic signals which are in the form of low-energy high-frequency short pulses. Such transmitting pulse generators, and electronic circuits and receiving and evaluating circuits which can be used in conjunction therewith, are described, for example, in U.S. Pat. Nos. 5,345,471 and 5,361,070. Pulses with a peak power of less than 1 $\mu$W and a useful power of 1 nW or less can be generated with frequencies of 100 MHz and more. The transmitted clock-pulse rate is, for example, a few MHz.

The electromagnetic signals are fed to the conductor 7 via the injector 9. Conversely, signals reflected along the conductor 7 pass to the receiving and evaluating circuit 15 via the conductor 7, the injector 9, the directional coupler 54 and a high-pass filter 56 connected downstream of the directional coupler 54.

The receiving and evaluating circuit 15 comprises a time-delay unit 58, at the input of which the transmitted clock pulse of the transmitting clock generator 50 is present and which generates a sampling clock pulse which corresponds to the transmitted clock pulse delayed by a variable delay time. The variable delay time is provided, for example, by means of a saw-tooth voltage generator. The sampling clock pulse is fed to a sampling pulse generator 60 which generates sampling pulses as a function of the sampling clock pulse and feeds them to a first input of a sample-and-hold circuit 62. The sampling and transmitting pulse generators 52, 60 are preferably identical, with the result that the electromagnetic signals they generate differ merely by the variable delay time.

The reflected signals are present, via the directional coupler 54 and the high-pass filter 56, at a second input of the sample-and-hold circuit 62.

In operation, short transmitted pulses are generated preferably periodically at the transmitted clock pulse frequency, and the reflected echo signals are fed to the sample-and-hold circuit 62. A sampling pulse is superposed there on each echo signal, and a total signal resulting therefrom is picked up, amplified by means of a downstream amplifier 64, digitized using an analog-to-digital converter 66 arranged in series with the amplifier 64, and fed to a microprocessor 68 as a sample.

The total signal is a measure of the agreement between the echo signal and sampling pulse. The echo signals arrive periodically and successive sampling pulses differ from one another in the time delay, running in accordance with a saw-tooth function. Assuming that successive echo signals do not differ substantially from one another, the sample-and-hold circuit 62 supplies a stroboscopic recording of the echo signals. This assumption is typically always fulfilled, since the level is virtually without change in the period of time between two transmitted pulses.

The microprocessor 68 is connected to the transmitting clock pulse generator 50 via a first line 70, and to the sampling clock pulse generator 58 via a second line 72. In operation, the microprocessor 68 regularly starts measuring cycles. During a measuring cycle, the electromagnetic signals are periodically generated, as previously described, and the reflected signals are sampled. A measuring cycle ends when all the time delays, provided in accordance with the saw-tooth function, have elapsed. The individual samples are respectively recorded in conjunction with the assigned instantaneous delay. This yields a measurement signal characteristic from which the time of flight can be determined.

Figure 8:
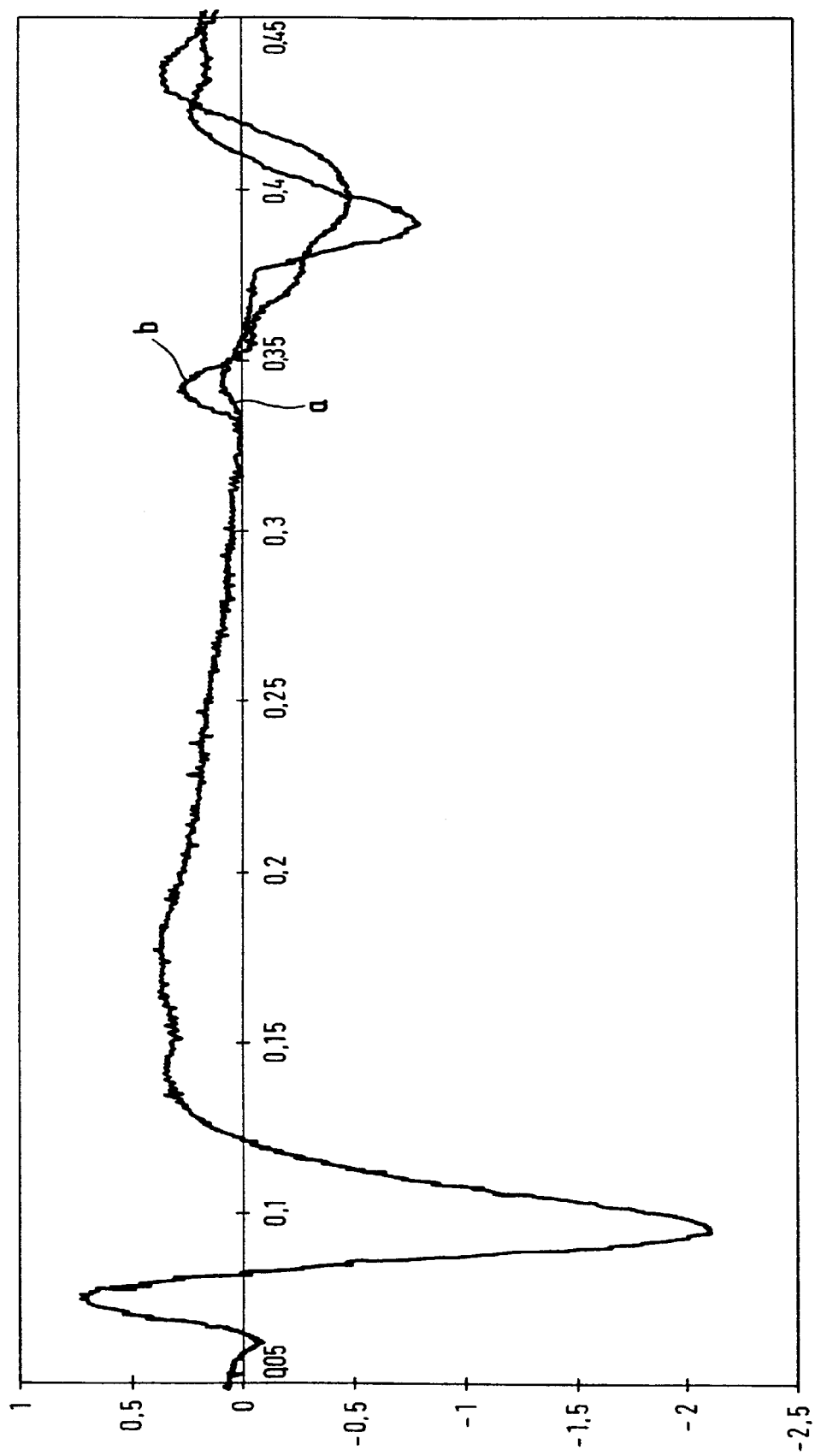
FIG. 8 shows measurement signal characteristics for a liquid level meter with and without float.

Two measurement signal characteristics are represented in FIG. 8, of which a first measurement signal characteristic, denoted by a, was recorded using a liquid level meter without a float, and a second measurement signal characteristic, denoted by b, was recorded using a liquid level meter with a float made from polytetrafluoroethylene (PTFE), which has an end face coated with aluminum foil and facing the injector. Both measurements were made with a filled material with a low dielectric constant. The normalized samples are plotted against the delay time in each case.

In the case of short delay times, the measurement signal characteristics a and b are identical. The first maximum in the two measurement signal characteristics a and b is caused by reflections in the region of the injector 9, where jumps in impedance necessarily occur. The second maximum in the measurement signal characteristic a can be ascribed to a reflection at the surface of the filled material, while the second maximum in the measurement signal characteristic b can be ascribed to a reflection at the float.

The amplitude of the second maximum of the measurement signal characteristic b is approximately three times as large as that of the second maximum of the measurement signal characteristic a, and the width of the reflection peak is markedly smaller for the measurement signal characteristic b than for the measurement signal characteristic a.

The accuracy with which the level can be determined depends substantially on how accurately the position of the second maximum can be ascertained. The accuracy is greater the larger the amplitude of the maximum and the lesser the width of the associated reflection peak. As FIG. 8 clearly shows, the measuring accuracy can be markedly improved by the use according to the invention of a float for filled materials with low dielectric constants.

What is claimed is:

1. A liquid level meter for measuring a level of a liquid in a container comprising:

an electronic circuit to generate electromagnetic signals;

an injector coupled at an opening of the container, said injector to transmit said electromagnetic signals from said electronic circuit;

a conductor that extends from said injector into the container, said conductor to transmit said electromagnetic signals from said injector into the container and lead reflected electromagnetic signals out of the container;

a float coupled to said conductor that permits said float to move along said conductor in conjunction with the level of the liquid in the container, said float comprising at least one segment to generate said reflected electromagnetic signals by reflecting said electromagnetic signals led to the float by said conductor; and a receiving and evaluating circuit to receive said reflected electromagnetic signals, determine a travel time based upon said reflected electromagnetic signals, and ascertain the level of the liquid in the container from said travel time.

2. The liquid level meter of claim 1, wherein said float comprises a hollow body, and said segment comprises a metal lateral surface of said hollow body.

3. The liquid level meter of claim 1, wherein said segment is arranged in said float such that said segment does not come into contact with the liquid in the container during operation.

4. The liquid level meter of claim 1, wherein said float comprises a material having a dielectric constant greater than 3.

5. The liquid level meter of claim 1, further comprising:

a holder at an end of said conductor averted from the injector, said holder to support said float when the level of the liquid surface is below the holder.

6. The liquid level meter of claim 1, wherein said float surrounds a cylindrical section of said conductor.

7. The liquid level meter of claim 1, wherein said float maintains said segment in a plane with the liquid in the container.

8. The liquid level meter of claim 1, wherein said float comprises a hollow body, and said segment comprises a metal-coated lateral surface of said hollow body.

* * * * *

UNITED STATES PATENT AND TRADEMARK OFFICE
CERTIFICATE OF CORRECTION

PATENT NO.    : 6,229,476 B1
DATED         : May 8, 2001
INVENTOR(S)   : Wolfram Lütke, Joachim Neuhaus, Ralf Reimelt, and Werner Thoren It is certified that error appears in the above-identified patent and that said Letters Patent is hereby corrected as shown below:

Title page,
The following cited references should be added under U.S. Patent Documents:

| | | |
|---|---|---|
| 3,296,862 | 1/10/67 | Ziniuk |
| 4,006,637 | 2/8/77 | Kinosita |
| 5,656,774 | 8/12/97 | Nelson et al. |
| 5,841,666 | 11/24/98 | Perdue et al. |

The following cited references should be added under Foreign Patent Documents:

| | | |
|---|---|---|
| WO 94/03782 | 2/17/94 | WIPO |
| DE 44 19 462 | 12/7/95 | Germany |
| DE 94 21 870 | 3/20/97 | Germany |

Signed and Sealed this

Thirteenth Day of November, 2001

Attest:

NICHOLAS P. GODICI
*Attesting Officer*   *Acting Director of the United States Patent and Trademark Office*